United States Patent [19]

Lobanoff et al.

[11] Patent Number: 4,776,625

[45] Date of Patent: Oct. 11, 1988

[54] CARGO COVER ACCESSORY

[75] Inventors: Mark Lobanoff, Troy; Michael D. Uhazie, Rochester Hills; James A. Gavagan, Center Line, all of Mich.

[73] Assignee: Irvin Industries, Inc., Rochester Hills, Mich.

[21] Appl. No.: 28,762

[22] Filed: Mar. 23, 1987

[51] Int. Cl.⁴ .............................................. B60R 5/04
[52] U.S. Cl. ................................................ 296/37.16
[58] Field of Search .................. 296/37.16, 37.8, 37.1; 224/42, 42 R

[56] References Cited

U.S. PATENT DOCUMENTS

| | | |
|---|---|---|
| Re. 15,904 | 8/1924 | Hein . |
| 1,122,390 | 12/1914 | Heater . |
| 1,571,019 | 1/1926 | Lucas . |
| 1,593,324 | 7/1926 | Anderson . |
| 1,657,257 | 1/1928 | Hamp . |
| 1,716,285 | 6/1929 | Szako . |
| 1,793,195 | 2/1931 | Roberts . |
| 1,820,292 | 8/1931 | Wright . |
| 1,844,599 | 2/1932 | Renzetti . |
| 1,932,475 | 10/1933 | Peteler . |
| 2,134,414 | 10/1938 | Norcross . |
| 2,829,003 | 4/1958 | Moyes . |
| 2,874,770 | 2/1959 | Rohr et al. . |
| 2,963,316 | 12/1960 | Matthews . |
| 3,056,626 | 10/1962 | Browne . |
| 3,882,921 | 5/1975 | Sandall . |
| 4,088,173 | 5/1978 | Antich . |
| 4,139,231 | 2/1979 | Lang et al. . |
| 4,168,094 | 9/1979 | Yagi . |
| 4,220,367 | 9/1980 | Gale et al. . |
| 4,222,601 | 9/1980 | White et al. . |
| 4,262,955 | 4/1981 | Duda ................................ 296/37.16 |
| 4,277,097 | 7/1981 | Lalanne ........................... 296/37.16 |
| 4,479,677 | 10/1984 | Gulette et al. . |
| 4,480,675 | 11/1984 | Berkemeier ...................... 296/37.16 |
| 4,480,676 | 11/1984 | Solomon . |
| 4,482,137 | 11/1984 | Gavagan et al. . |
| 4,497,515 | 2/1985 | Appelson . |
| 4,502,674 | 3/1985 | White et al. . |
| 4,668,001 | 5/1987 | Okumura et al. ................ 296/37.16 |

FOREIGN PATENT DOCUMENTS

| | | |
|---|---|---|
| 1143412 | 3/1983 | Canada . |
| 0093934 | 4/1983 | European Pat. Off. . |
| 85851 | 8/1983 | European Pat. Off. ......... 296/37.16 |
| 0111270 | 12/1983 | European Pat. Off. . |
| 2445025 | 3/1975 | Fed. Rep. of Germany . |
| 2517077 | 10/1976 | Fed. Rep. of Germany ... 296/37.16 |
| 2513632 | 10/1976 | Fed. Rep. of Germany ... 296/37.16 |
| 2841218 | 7/1980 | Fed. Rep. of Germany . |
| 3226400 | 1/1984 | Fed. Rep. of Germany . |
| 3345503 | 6/1985 | Fed. Rep. of Germany . |
| 57-60908 | 4/1982 | Japan . |
| 194164 | 11/1982 | Japan .............................. 296/37.16 |

Primary Examiner—James B. Marbert
Attorney, Agent, or Firm—Harness, Dickey & Pierce

[57] ABSTRACT

An accessory cover apparatus for selectively covering or exposing an open vehicle compartment includes an adjustable mounting assembly interconnectable with the vehicle for mounting and supporting the cover apparatus generally adjacent the compartment opening at an intermediate longitudinal position between the compartments ends. The cover apparatus includes a first cover member that is longitudinally movable between retracted and extended positions. A second cover member protrudes generally in an opposite direction from that of the extended first cover member and is pivotally movable between a closed position and an open position. Preferably, the cover apparatus according to the present invention further includes an open enclosure member disposed beneath the second cover assembly for defining a storage sub-compartment, with the second cover member substantially closing off the sub-compartment when in its closed position and providing access to the interior of the sub-compartment when in its open position.

11 Claims, 3 Drawing Sheets

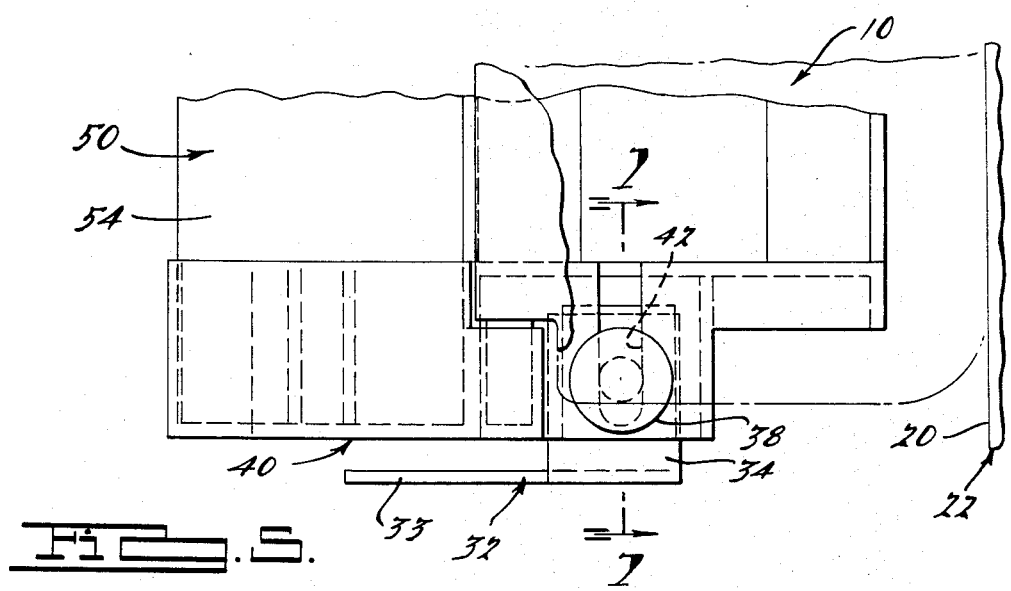

CARGO COVER ACCESSORY

BACKGROUND AND SUMMARY OF THE INVENTION

The invention relates generally to an accessory cover apparatus for selectively covering or exposing an otherwise open vehicle cargo compartment, and more particularly to such a cover apparatus that serves as a security curtain to conceal luggage or other objects carried in the rear compartment of a hatchback, station wagon, pickup truck or similar type vehicle wherein the contents of such a cargo compartment would otherwise be in plain view.

Various cover or security curtain apparatuses for vehicle cargo compartments have previously been provided in the prior art. Many of such prior art cover apparatuses, however, have been found to be inconvenient to use, or relatively expensive to manufacture or install, or have not provided a sufficiently complete and close-fitting cover or barrier to prevent observation of the contents of the cargo compartment. This is due to the fact that many of such prior art cover apparatuses do not fit closely to the ends and/or sides of the compartment, thus leaving gaps through which the contents of the compartment can be observed.

Many of the above disadvantages of prior art cover apparatuses have been addressed and overcome by various cover apparatuses such as those disclosed and claimed in U.S. Pat. Nos. 4,139,231; 4,222,601; 4,502,674; 4,479,677; and 4,482,137, for example, all of which are owned by Irvin Industries, the assignee of the present invention, and the disclosures of which are incorporated by reference herein. The various cover apparatuses and components disclosed and claimed in these United States patents have performed well and have provided an effective barrier for concealing the contents of a vehicle compartment. Certain recent changes in vehicle interior designs and configurations, including the recent provision of shoulder harness retention belts for rear seat passengers, have necessitated the provision of clearance between the cover apparatus and the rear side of a rear seat assembly, thus creating a gap that must be filled in order to effectively obscure the contents of the compartment from view.

Therefore, the present invention seeks to provide a vehicle compartment cover apparatus that is relatively simple and inexpensive to manufacture and install, and that provides a relatively close-fitting barrier or security curtain, while accommodating the provision of rear seat shoulder harnesses or other vehicle interior design parameters requiring clearance adjacent a rear seat assembly or other vehicle interior components.

According to the present invention, a cover apparatus for selectively covering or exposing an open vehicle compartment includes a mounting assembly adapted to be interconnected with the vehicle for mounting and supporting the cover apparatus generally adjacent the compartment opening at a longitudinal position generally between the longitudinally-spaced compartments ends. The cover apparatus includes a first cover assembly interconnected with the mounting assembly and extending laterally across the compartment opening. A first cover member is selectively movable between a longitudinally retracted position and a longitudinally extended position, preferably by way of a rollup mechanism such as that described in the above-mentioned United States patents, with the first cover member extending generally between the mounting assembly and one of the compartment ends when in its extended position. The first cover member is also releasably attachable to the compartment end, or to a hatchback door, in order to releasably retain the cover member in its extended position.

A second cover assembly is interconnected with the mounting assembly and extends laterally across the compartment opening, with a second cover member selectively pivotally movable relative to the mounting assembly between a closed position in which the second cover member extends generally between the mounting assembly and a second of the compartment ends and an open position wherein the cover member is pivoted away from the second compartment ends.

Preferably, the cover apparatus according to the present invention further includes an open enclosure member disposed generally within the vehicle compartment and generally adjacent the second cover assembly. The open enclosure defines, at least in part, a sub-compartment with the second cover member substantially closing off the sub-compartment when in its closed position and providing access to the interior of the sub-compartment when in its open position. A preferred detent arrangement is provided for releasably retaining the closed second cover member in a relatively tight-fitting relationship with the rear side of a rear seat assembly, or such other compartment end, and for urging the second cover member toward its closed position when it is moved to a pivoted position closely adjacent the closed position.

The preferred mounting assembly for the cover apparatus according to the present invention includes mounting bracket members interconnected with the laterally spaced-apart compartment sides and with both of the above-mentioned cover assemblies for supporting the cover apparatus relative to the vehicle. The mounting assembly also includes provisions for adjustably varying the lateral position of the mounting bracket members relative to the cover assemblies in order to accommodate variations in the lateral dimension between the compartment sides, such as the variations that occur within a given vehicle model due to various interior equipment or trim options. Additionally, due to the provision of the above-discussed pivotal second cover member, the mounting assembly can be mounted in a longitudinally spaced-apart relationship with the rearward side of a rear seat assembly in order to provide the gap or clearance required for rear seat shoulder harnesses or other equipment, while still allowing this gap to be closed off to obscure the cargo compartment interior from view.

Additional objects, advantages and features of the present invention will become apparent from the following description and appended claims, taken in conjunction with the accompanying drawings.

BRIEF DESCRIPTION OF THE DRAWINGS

FIG. 5 is a partial top plan view of the mounting and supporting assembly for the cover apparatus of FIG. 1.

FIG. 6 is a partial cross-sectional view of the hinge assembly for the pivotal cover member for the cover apparatus according to the present invention, taken generally along line 6—6 of FIG. 1.

FIG. 7 is a partial cross-sectional view taken generally along line 7—7 of FIG. 5.

DETAILED DESCRIPTION OF THE PREFERRED EMBODIMENTS

Figure 1:
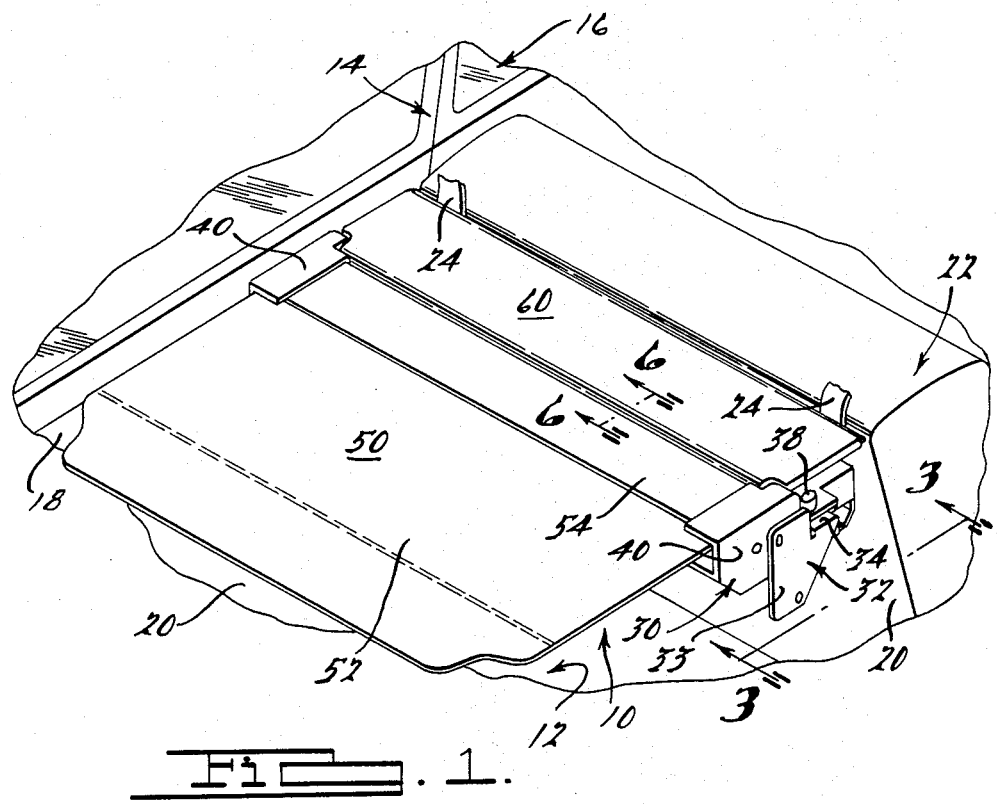
FIG. 1 is a perspective view of an exemplary vehicle compartment cover apparatus according to the present invention.
Figure 2:
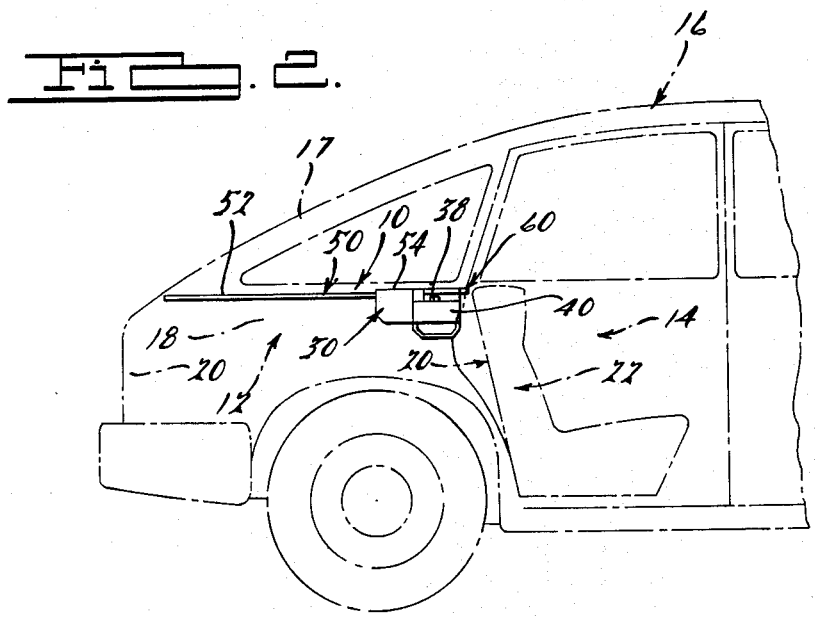
FIG. 2 is a diagrammatic side view of the rear portion of a hatchback-type vehicle, illustrating the general arrangement of the cover apparatus of FIG. 1 installed therein.

FIGS. 1 through 7 illustrate an exemplary embodiment of a vehicle compartment cover apparatus mounted in the interior of a hatchback-type vehicle and provided for selectively covering or exposing the interior of a vehicle cargo compartment in accordance with the present invention. From the following discussion, taken in conjunction with the drawings and the appended claims, one skilled in the art will readily recognize that the cover apparatus shown in FIGS. 1 through 7 is shown merely for purposes of illustration and that the principles of the present invention can also be applied to vehicle cover apparatuses of other configurations, and to those employed in conjunction with vehicle compartments other than that shown for purposes of illustration in the drawings.

As illustrated in FIGS. 1 through 7, the present invention provides a cover apparatus 10 adapted for selectively covering or exposing a vehicle compartment 12 in an interior 14 of a vehicle 16. The vehicle compartment 12 typically includes a pair of laterally spaced-apart sides 18 and a pair of longitudinally spaced-apart front and rearward ends 20, the front of which is defined by the rearward side of a rear seat assembly 22 and the rear of which is adjacent, or defined by, the hatchback door 17 in the exemplary vehicle 16 illustrated in the drawings. In accordance with recent trends in automotive interior design, the rear seat assembly 22 is equipped with a number of shoulder harness assemblies 24, portions of which typically extend in a generally vertical direction along the rearward side of the rear seat assembly 22.

The cover apparatus 10 generally includes a mounting assembly 30, a first rollup cover assembly 50, and a second pivotal cover assembly 60. The mounting assembly 30 preferably includes a pair of mounting brackets 32 adapted to be secured with fasteners or the like to the compartment sides 18, with the rollup cover assembly 50 and the pivotal cover assembly 60 extending laterally therebetween. In order to accommodate the clearance necessary for the provision of the shoulder harness assemblies 24 along the rearward side of the rear seat assembly 22, the mounting brackets 32 are disposed at a longitudinal position generally between the rear seat assembly 22 and the rearward end 20 of the vehicle compartment 12.

The mounting brackets 32 preferably each include a plate portion 33, with a tab portion 34 extending laterally inwardly therefrom. An opening 35 is provided through the tab portion 34 for receiving an adjusting screw 38 therein at a fixed position relative to the mounting bracket 32, with the adjusting screw 38 threadably engageable with a J-clip or other threaded retainer 39 interconnected with the tab portion 34. Correspondingly, a pair of end caps 40 are provided at opposite lateral ends of the rollup cover assembly 50 and the pivotal cover assembly 60, with each of the end caps 40 having a laterally elongated opening 42 extending therethrough, as shown in FIGS. 5 and 7. The elongated openings 42 also receive the adjusting screws 38 therethrough, and thus allow for a small adjustable variance in the lateral position of the mounting brackets 32 relative to the end caps 40. This adjustment feature on both lateral ends of the rollup cover assembly 50 and the pivotal cover assembly 60 serves to accommodate variations in the lateral width of the vehicle interior 14 or in the lateral spacing of the sides 18 of the vehicle cargo compartment 12, which commonly occur even in a given vehicle model as a result of differing thickness of various interior equipment and trim options, for example.

The rollup cover assembly 50 preferably includes a cover member 52 selectively extendable in a rearward direction in the exemplary embodiment shown in FIGS. 1 through 7, and retractable in a frontward direction by way of its interconnection with rollup member 56 rotatably housed within a rollup cassette housing 54, which is in turn interconnected with the end caps 40. Examples of such rollup extension/retraction assemblies for vehicle cargo compartment covers generally of the type illustrated herein are shown and described in the above-referenced U.S. patent applications.

The extension of the cover member 52 in a generally rearward direction, where it can be releasably attached to either the rearward end 20 of the vehicle compartment 12 or to a hatchback door 17, serves to obscure the contents of the vehicle compartment 12 from view. The cover member 52 and its associated rollup cassette housing 54 are sized for a particular vehicular application so that when extended rearwardly over the opening of the vehicle compartment 12 from the housing assembly 20, the cover member 52 is in a relatively close-fitting relationship with the compartment sides 18 and the rearward end 20 of the vehicle compartment 12.

The pivotal cover assembly 60 preferably includes a cover member 62 and an enclosure member 64 disposed in a generally frontward portion of the vehicle compartment 12 and interconnected with the cassette 54 and/or the end caps 40 in order to define a sub-compartment 66, which is adapted for storage of miscellaneous items 65. The cover member 62 is pivotally interconnected with the end caps 40 by way of a number of hinge assemblies 68, which are preferably laterally spaced along the lateral width of the cover apparatus 10, for pivotal movement of the cover member 62 relative to the mounting assembly 30 and the rollup cover assembly 50. The cover member 62 is selectively pivotal between a closed position extending generally between the mounting assembly 30 and the rear seat assembly 22 in order to cover the sub-compartment 66 and to fill in the space between the mounting assembly 20 and the rear seat assembly 22, and an open position wherein the cover member 62 is pivoted generally away from the rear seat assembly 22 in order to provide access to the sub-compartment 66, as shown in phantom lines in FIG. 3. Because the pivotal cover member 62 abuttingly engages the rearward side of the rear seat assembly 22, it can accommodate the rear seat shoulder harnesses 24 or other such equipment while substantially closing off the gap or space between the mounting assembly 30 and the rear seat assembly 22.

In the preferred embodiments of the present invention, each hinge assembly 68 is provided with a detent arrangement resulting from the generally flat engagement of a flat portion 70 on one side of a pintle or pivot rod 72, which is secured to the end caps 40, with a flat portion on a preferably resilient socket member 74, which is secured to a centerboard 67 of the cover member 62 for pivotal movement therewith. The detent arrangement serves to releasably retain the second cover member 62 in its closed position and, due to the resiliency of the preferred socket member 74, also urges the cover member 62 toward its closed position whenever it is moved to a pivoted position closely adjacent such closed position.

Figure 3:
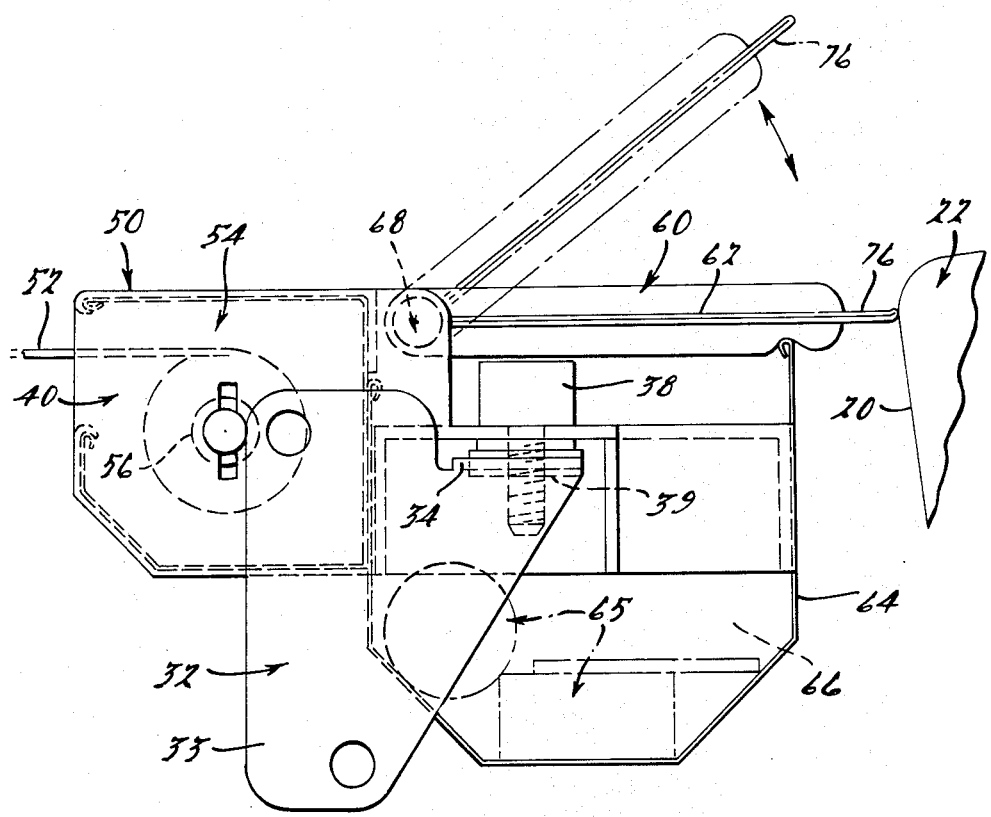
FIG. 3 is a partial side elevation view, taken generally along line 3—3 of FIG. 1.
Figure 4:
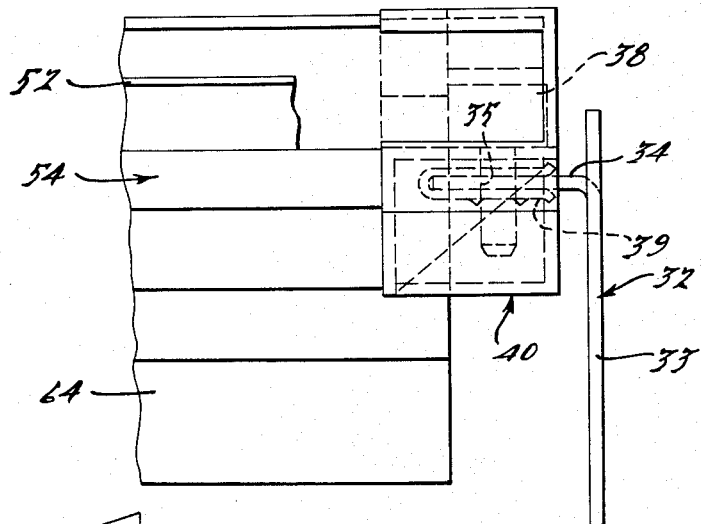
FIG. 4 is a partial rear elevational view of the mounting and supporting assembly for the cover apparatus of FIG. 1.

The hinge assemblies 68 and the centerboard 67 of the cover member 62 are preferably covered by a fabric or upholstery material, which can optionally be padded, or by other suitably finished materials that complement the interior 14 of the vehicle 16. At least along its forward edge, such cover material is also preferably provided with a deflectable edge portion 76, as shown in FIG. 3, for deflectably and abuttingly engaging the seat assembly 22 when the cover member 62 is in its closed position. This arrangement substantially eliminates any gaps between the seat assembly 22 and the cover member 62, while accommodating the rear seat shoulder harnesses 24 extending along the rearward side of the seat assembly 22.

The cover apparatus 10 described herein and illustrated in the drawings by way of an exemplary embodiment represents a relatively simple and inexpensive accessory cover apparatus that provides a relatively close-fitting barrier or security curtain for obscuring items stored in a vehicle cargo compartment from view, while accommodating the provision of rear seat shoulder harnesses or other interior design parameters requiring clearance adjacent a rear seat assembly or other vehicle interior components, and while providing for a small degree of lateral adjustability for mounting in various versions of a particular vehicle model having differing interior appointments or trim. However, the foregoing discussion and the illustrations in the accompanying drawings disclose and describe merely exemplary embodiments of the present invention. One skilled in the art will readily recognize from such discussion, and from the accompanying drawings and claims, that various changes, modifications, and variations may be made therein without departing from the spirit and scope of the invention as defined in the following claims.

What is claimed is:

1. A cover apparatus for selectively covering and exposing an open vehicle compartment having a compartment opening and being defined at least in part by longitudinally spaced-apart ends and laterally spaced-apart sides, said cover apparatus comprising:

mounting means adapted to be interconnected with the vehicle for mounting said cover apparatus generally adjacent said compartment opening at a longitudinal position longitudinally between the compartment ends;

a first cover assembly interconnected with said mounting means and extending laterally across said compartment opening, said first cover assembly including a first cover member selectively movable between a longitudinally retracted position and a longitudinally extended position extending between said mounting means and a position adjacent a first of said compartment ends; and a second cover assembly interconnected with said mounting means and extending laterally across said compartment opening, said second cover assembly including a second cover member selectively pivotally movable relative to said mounting means between a closed position extending between said mounting means and a position adjacent a second of said compartment ends opposite said first compartment end and an open position wherein said cover member is pivoted away from said second compartment end said second cover assembly further including hinge means for pivotally interconnecting said second cover member with said second cover assembly and for releasably retaining said second cover member in any of a number of pivoted positions between said open and closed positions, and said hinge means further including detent means for releasably retaining said second cover member in said closed position and for resiliently urging said second cover member toward said closed position when said second cover member is moved to a pivotal position closely adjacent said closed position.

2. A cover apparatus according to claim 1, further including an open enclosure disposed in said compartment generally adjacent said second cover assembly and defining at least in part a sub-compartment within said compartment, said second cover member substantially closing off said sub-compartment when in said closed position and providing access to the interior of said sub-compartment when in said open position.

3. A cover apparatus according to claim 1, wherein said mounting means includes mounting members interconnectable with the laterally spaced-apart compartment sides and with said first and second cover assemblies for supporting said first and second cover assemblies relative to the vehicle, and adjustment means for adjustably varying the lateral position of said mounting members relative to said first and second cover assemblies in order to accommodate variations in the lateral dimension between the compartment sides.

4. A cover apparatus according to claim 3, wherein said mounting members each include an opening therethrough and a mounting screw received in said opening at a fixed lateral position thereon, said mounting means further including an end cap structure adjacent each of said mounting members, each of said end cap structures having a laterally elongated opening therein for receiving said mounting screw at any of a number of adjustably variable lateral positions in said laterally elongated opening.

5. A cover apparatus according to claim 4, wherein said first cover assembly includes a cassette housing and a roller member rotatably housed within said cassette housing, said first cover member being interconnected with said roller member for rollup retraction thereon, said cover apparatus further including an open enclosure disposed in said compartment generally adjacent said second cover assembly and defining at least in part a sub-compartment within said compartment, said enclosure being interconnected with said cassette housing, said second cover member substantially closing said sub-compartment when in said closed position and providing access to the interior of said sub-compartment when in said open position.

6. A cover apparatus according to claim 1, wherein said second compartment end is defined by a vehicle seat assembly, said second cover member engaging said vehicle seat when in said closed position.

7. A cover apparatus according to claim 6, wherein said second cover member includes a deflectable edge portion, said edge portion deflectably engaging said vehicle seat assembly when said second cover member is in said closed position in order to substantially eliminate gaps between said vehicle seat assembly and said second cover member.

8. A cover apparatus for selectively covering and exposing an open vehicle compartment having a compartment opening and being defined at least in part by longitudinally spaced-apart ends and laterally spaced-apart sides, said cover apparatus comprising:
mounting means adapted to be interconnected with the vehicle for mounting said cover apparatus generally adjacent said compartment opening at a longitudinal position longitudinally between the compartment ends;
a first cover assembly interconnected with said mounting means and extending laterally across said compartment opening, said first cover assembly including a first cover member selectively movable between a longitudinally retracted position and a longitudinally extended position extending between said mounting means and a position adjacent a first of said compartment ends; and
a second cover assembly interconnected with said mounting means and extending laterally across said compartment opening, said second cover assembly including a second cover member selectively pivotally movable relative to said mounting means between a closed position extending between said mounting means and a position adjacent a second of said compartment ends opposite said first compartment end and an open position wherein said cover member is pivoted away from said second compartment end, said second cover assembly further including an open enclosure disposed in said compartment generally adjacent said second cover assembly and defining at least in part a sub-compartment within said compartment, said second cover member substantially closing said sub-compartment when in said closed position and providing access to the interior of said sub-compartment when in said open position, said second cover assembly further including hinge means for pivotally interconnecting said second cover member with said first cover assembly and for releasably retaining said second cover member in any of a number of pivoted positions between said open and closed positions, said hinge means including detent means for releasably retaining said second cover member in said closed position and for resiliently urging said second cover member toward said closed position when said second cover member is moved to a pivotal position closely adjacent said closed position,
said mounting means further including mounting members interconnectable with the laterally spaced-apart compartment sides and with said first and second cover assemblies for supporting said first and second cover assemblies relative to the vehicle, and adjustment means for adjustably varying the lateral position of said mounting members relative to said first and second cover assemblies in order to accommodate variations in the lateral dimension between the compartment sides, said mounting members each include an opening therethrough and a mounting screw received in said opening at a fixed lateral position thereon, said mounting means further including an end cap structure adjacent each of said mounting members, each of said end cap structures having a laterally elongated opening therein for receiving said mounting screw at any of a number of adjustably variable lateral positions in said laterally elongated opening.

9. A cover apparatus according to claim 8, wherein said first cover assembly includes a cassette housing and a roller member rotatably housed within said cassette housing, said first cover member being interconnected with said roller member for rollup retraction thereon, said cassette housing and said open enclosure being interconnected with one another and with said end cap structure.

10. A cover apparatus according to claim 8, wherein said second compartment end is defined by a vehicle seat assembly, said second cover member engaging said vehicle seat when in said closed position.

11. A cover apparatus according to claim 10, wherein said second cover member includes a deflectable edge portion, said edge portion deflectably engaging said vehicle seat assembly when said second cover member is in said closed position in order to substantially eliminate gaps between said vehicle seat assembly and said second cover member.

* * * * *